(12) United States Patent
Brandt et al.

(10) Patent No.: US 9,164,918 B2
(45) Date of Patent: *Oct. 20, 2015

(54) MAINTAINING PROCESSOR RESOURCES DURING ARCHITECTURAL EVENTS

(71) Applicant: Intel Corporation, Santa Clara, CA (US)

(72) Inventors: Jason W. Brandt, Austin, TX (US);
Sanjoy K. Mondal, Austin, TX (US);
Richard A. Uhlig, Hillsboro, OR (US);
Gilbert Neiger, Hillsboro, OR (US);
Robert T. George, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,345

(22) Filed: Dec. 23, 2014

(65) Prior Publication Data

US 2015/0227470 A1 Aug. 13, 2015

Related U.S. Application Data

(63) Continuation of application No. 13/837,997, filed on Mar. 15, 2013, which is a continuation of application No. 13/708,547, filed on Dec. 7, 2012, now Pat. No. 8,788,790, which is a continuation of application No.

(Continued)

(51) Int. Cl.
| | |
|---|---|
| *G06F 12/00* | (2006.01) |
| *G06F 13/00* | (2006.01) |
| *G06F 12/10* | (2006.01) |
| *G06F 12/12* | (2006.01) |
| *G06F 9/455* | (2006.01) |

(52) U.S. Cl.
CPC ........ *G06F 12/1063* (2013.01); *G06F 9/45533* (2013.01); *G06F 12/12* (2013.01); *G06F 2212/604* (2013.01); *G06F 2212/68* (2013.01)

(58) Field of Classification Search
None
See application file for complete search history.

(56) References Cited

U.S. PATENT DOCUMENTS

| | | | |
|---|---|---|---|
| 5,123,101 | A | 6/1992 | Sindhu |
| 5,319,760 | A | 6/1994 | Mason et al. |
| 5,892,944 | A | 4/1999 | Fukumoto et al. |
| 6,035,380 | A | 3/2000 | Shelton et al. |

(Continued)

FOREIGN PATENT DOCUMENTS

| | | |
|---|---|---|
| CN | 1139489 A | 1/1997 |
| CN | 1489058 A | 4/2004 |

(Continued)

OTHER PUBLICATIONS

Panda et al., "On-Chip vs. Off-Chip Memory: The Data Partitioning Problem in Embedded Processor-Based Systems", Jul. 2000, ACM Transactions on Design Automation of Electronic Systems, vol. 5, Issue 3, pp. 682-704.

Cox et al., "A Maximum Likelihood Stereo Algorithm", Computer Vision and Image Understanding,vol. 63, Issue 3, May 1996, pp. 542-567.

MacKenzie et al., "FUGU: Implementing Translation and Protection in a Multiuser, Multimodel Multiprocessor", Technical Memorandum MIT/LCS/TM503, MIT, Oct. 24, 1994, pp. 1-30.

(Continued)

*Primary Examiner* — Sean D Rossiter
(74) *Attorney, Agent, or Firm* — Thomas R. Lane

(57) ABSTRACT

In one embodiment of the present invention, a method includes switching between a first address space and a second address space, determining if the second address space exists in a list of address spaces; and maintaining entries of the first address space in a translation buffer after the switching. In such manner, overhead associated with such a context switch may be reduced.

7 Claims, 6 Drawing Sheets

Related U.S. Application Data

13/020,161, filed on Feb. 3, 2011, now Pat. No. 8,543,793, which is a continuation of application No. 12/483,519, filed on Jun. 12, 2009, now Pat. No. 7,899,972, which is a continuation of application No. 10/903,704, filed on Jul. 30, 2004, now Pat. No. 7,562,179.

(56) References Cited

U.S. PATENT DOCUMENTS

| | | | |
|---|---|---|---|
| 6,047,354 | A | 4/2000 | Yoshioka et al. |
| 6,075,938 | A | 6/2000 | Bugnion et al. |
| 6,327,646 | B1 | 12/2001 | Sharma et al. |
| 6,356,989 | B1 | 3/2002 | Hays et al. |
| 6,418,521 | B1 | 7/2002 | Mathews et al. |
| 6,510,508 | B1 | 1/2003 | Zuraski et al. |
| 6,604,187 | B1 | 8/2003 | McGrath et al. |
| 6,779,085 | B2 | 8/2004 | Chauvel |
| 6,854,046 | B1 * | 2/2005 | Evans et al. ............... 711/203 |
| 7,409,487 | B1 | 8/2008 | Chen et al. |
| 7,552,254 | B1 | 6/2009 | George et al. |
| 7,552,255 | B1 * | 6/2009 | George et al. ............... 710/58 |
| 2002/0082824 | A1 | 6/2002 | Neiger et al. |
| 2003/0217250 | A1 | 11/2003 | Bennett et al. |
| 2004/0117593 | A1 | 6/2004 | Uhlig et al. |
| 2004/0162930 | A1 | 8/2004 | Forin et al. |
| 2007/0006230 | A1 | 1/2007 | Neiger et al. |

FOREIGN PATENT DOCUMENTS

| | | | |
|---|---|---|---|
| CN | 1489059 | A | 4/2004 |
| DE | 10084753 | T5 | 4/2004 |
| DE | 10357804 | A1 | 7/2004 |
| EP | 1296333 | A2 | 3/2003 |
| JP | 55-3077 | A | 1/1980 |
| JP | 60-100245 | A | 6/1985 |
| JP | 03-185539 | A | 8/1991 |
| JP | 04-349548 | A | 12/1992 |
| JP | 6-139149 | A | 5/1994 |
| JP | 6-318179 | A | 11/1994 |
| JP | 6-332803 | A | 12/1994 |
| JP | 07-084883 | A | 3/1995 |
| JP | 07-105091 | A | 4/1995 |
| JP | 07-134658 | A | 5/1995 |
| JP | 7-134659 | A | 5/1995 |
| JP | 08-320830 | A | 12/1996 |
| JP | 09-109380 | A | 4/1997 |
| JP | 09-120374 | A | 5/1997 |
| JP | 11-007411 | A | 1/1999 |
| JP | 2000-040029 | A | 2/2000 |
| JP | 2004-503870 | A | 2/2004 |
| JP | 2005-521124 | A | 7/2005 |
| JP | 2011-23017 | A | 2/2011 |
| WO | 2004/061659 | A2 | 7/2004 |
| WO | 2006/019914 | A2 | 2/2006 |
| WO | 2006/019914 | A3 | 6/2006 |

OTHER PUBLICATIONS

Office Action received for Chinese Patent Application No. 200580025726.X, mailed on Apr. 3, 2009, 4 pages of English Translation and 3 pages of Office Action.

Office Action received for Chinese Patent Application No. 200580025726.X, mailed on Jun. 6, 2008, 14 pages of English Translation and 8 pages of Office Action.

Office Action received for Chinese Patent Application No. 200580025726.X, mailed on Dec. 12, 2008, 5 pages of English Translation and 4 pages of Office Action.

Office Action received for German Patent Application No. 112005001798.2, mailed on Feb. 28, 2008, 2 pages of English Translation and 3 pages of Office Action.

Office Action received for Japanese Patent Application No. 2007-523610, mailed on May 11, 2010, 3 pages of English Translation and 3 pages of Office Action.

Notification of Reasons for Refusal received for Japanese Patent Application No. 2007-523610, mailed on Sep. 7, 2010, 2 pages of English Translation and 2 pages of Notification of Reasons for Refusal.

Office Action received for U.S. Appl. No. 12/413,655, mailed on Apr. 13, 2010, 15 pages of Office Action.

Response to Office Action filed for U.S. Appl. No. 12/413,655, filed Jul. 9, 2010, 8 pages of Response to Office Action.

Office Action received for U.S. Appl. No. 12/483,519, mailed on Jul. 20, 2010, 17 pages of Office Action.

Office Action received for German Patent Application No. 112005001798.2, mailed on Aug. 19, 2009, 3 pages of English Translation and 3 pages of Office Action.

International Search Report and Written Opinion received for PCT Patent Application No. PCT/US2005/024997, mailed on May 10, 2006, 19 pages.

International Preliminary Report on Patentability received for PCT Patent Application No. PCT/US2005/024997, mailed on Feb. 8, 2007, 12 pages.

Office Action received for German Patent Application No. 112005001798.2, mailed on Jun. 30, 2011, 5 pages of German Office Action including 3 pages of English Translation.

Office Action received for Chinese Patent Application No. 201010227657.3, mailed on Aug. 29, 2011, 12 pages of Chinese Office Action including 7 pages of English Translation.

IA-32 Intel architecture software Developer's Manual, vol. 3: System Programming Guide, Intel corporation, 2002.

Office Action received for Chinese Patent Application No. 201010227657.3, mailed on Jul. 4, 2012, 7 pages of Chinese Office Action and 7 pages of English Translation.

Office Action Received for U.S. Appl. No. 12/413,655, malied on Aug. 13, 2010, 12 Pages of Office Action.

Response to Office Action, for U.S. Appl. No. 12/413,655, filed Oct. 11, 2010, 6 Pages of Office Action Response.

Office Action received for Japanese Patent Divisional Application No. 2010-179219, mailed on Sep. 18, 2012, 3 pages of English Translation and 4 pages of Japanese Office Action.

Office Action received for Japanese Patent Divisional Application No. 2010-179220, mailed on Sep. 25, 2012, 3 pages of English Translation and 3 pages of Japanese Office Action.

Pentium (R) Pro Family Developer's Manual, vol. 3: Operating System Writers' Guide, Intel, Dec. 1995, pp. 3-28.

Office Action received for Japanese Patent Divisional Application No. 2011-106136, mailed on Nov. 27, 2012, 4 pages of English Translation and 4 pages of Japanese Office Action.

Office Action received for Japanese Patent Divisional Application No. 2011-106137, mailed on Nov. 27, 2012, 4 pages of English Translation and 4 pages of Japanese Office Action.

Office Action received for Japanese Patent Divisional Application No. 2010-179219, mailed on Jan. 29, 2013, 3 pages of English Translation and 3 pages of Japanese Office Action.

Office Action received for Japanese Patent Divisional Application No. 2010-179219, mailed on May 28, 2013, 2 pages of English Translation and 3 pages of Japanese Office Action.

Office Action received for Japanese Patent Divisional Application No. 2013-092397, mailed on Mar. 11, 2014, 5 pages of English Translation and 5 pages of Japanese Office Action.

Office Action received for Japanese Patent Divisional Application No. 2013-204470, mailed on Apr. 30, 2014, 3 pages of English Translation and 5 pages of Japanese Office Action.

Nakamori, Akari, "Introduction to Microprocessor Architecture", vol. 1, 20, CQ publishing company, Apr. 1, 2004, vol. 20, 11 pages.

Office Action received for Japanese Patent Divisional Application No. 2013-092397, mailed on Aug. 12, 2014, 3 pages of English Translation and 3 pages of Japanese Office Action.

Office Action received for Japanese Patent Divisional Application No. 2013-204470, mailed on Nov. 11, 2014, 2 pages of English Translation and 2 pages of Japanese Office Action.

Office Action received for German Patent Application No. 112005003863.7, mailed on Mar. 4, 2015, 3 pages of English Translation and 3 pages of Office Action.

* cited by examiner

MAINTAINING PROCESSOR RESOURCES DURING ARCHITECTURAL EVENTS

CLAIM TO PRIORITY

This application is a Continuation of U.S. patent application Ser. No. 13/837,997, filed Mar. 15, 2013, entitled, "MAINTAINING PROCESSOR RESOURCES DURING ARCHITECTURAL EVENTS", which is a Continuation of U.S. patent application Ser. No. 13/708,547, filed Dec. 7, 2012, entitled, "MAINTAINING PROCESSOR RESOURCES DURING ARCHITECTURAL EVENTS", now U.S. Issued U.S. Pat. No. 8,788,790, Issued on Jul. 22, 2014, which is a Continuation of U.S. patent application Ser. No. 13/020,161, filed Feb. 3, 2011, and entitled "MAINTAINING PROCESSOR RESOURCES DURING ARCHITECTURAL EVENTS", now U.S. Issued U.S. Pat. No. 8,543,793, Issued on Sep. 24, 2013 which is a continuation of U.S. patent application Ser. No. 12/483,519, filed Jun. 12, 2009, entitled "MAINTAINING PROCESSOR RESOURCES DURING ARCHITECTURAL EVENTS" now U.S. Issued U.S. Pat. No. 7,889,972, Issued on Mar. 1, 2011, which is a continuation of U.S. patent application Ser. No. 10/903,704 filed Jul. 30, 2004 entitled "MAINTAINING PROCESSOR RESOURCES DURING ARCHITECTURAL EVENTS," now U.S. Issued U.S. Pat. No. 7,562,179, Issued on Jul. 14, 2009, the content of which is hereby incorporated by reference in its entirety into this application.

BACKGROUND

The present invention relates generally to data processing systems, and more particularly to processing in different contexts using a processor.

Many current computer systems use virtual memory systems to manage and allocate memory to various processes running within the system, which allow each process running on the system to operate as if it has control of the full range of addresses provided by the system. The operating system (OS) maps the virtual address space for each process to the actual physical address space for the system. Mapping from a physical address to a virtual address is typically maintained through the use of page tables.

Processor performance is improved via a multiple-stage pipeline architecture, in which various pipeline resources, such as caches, buffers, arrays, and the like may be used to more efficiently execute instructions. One such pipeline resource that improves use of virtual memory systems is a translation lookaside buffer (TLB). A TLB is a relatively small section of memory in a processor pipeline which caches part of the system's virtual address to physical address translations. Specifically, a few elements of the translation set are stored in the TLB which the processor can access extremely quickly. Various TLBs may exist in a system. For example, separate TLBs may exist for instructions and data (respectively, an instruction TLB (iTLB) and a data TLB (dTLB)). More so, in certain systems a second level dTLB (STLB) may be present.

If a translation for a particular virtual address is not present in the TLB, a "translation miss" occurs and the address translation is resolved using more general mechanisms. Processing in this manner continues until a context switch occurs. A context switch may occur when a multitasking OS stops running one process (e.g., an application) and begins running another. When a context switch occurs, page tables including a page directory and a page table for the new process are loaded, and the TLB and other pipeline resources must be flushed. By flushed, it is meant that the resources' contents are cleared.

Certain systems may implement a virtual machine (VM) environment in which a virtual machine monitor (VMM) presents to other software the abstraction of one or more virtual machines. Each VM may function as a self-contained platform, running its own "guest operating system" (i.e., an OS hosted by the VMM) and other software, collectively referred to as guest software (or simply a "guest"). The guest software expects to operate as if it were running on a dedicated computer rather than a virtual machine. Accordingly, the guest software expects to control various events and have access to hardware resources, such as processor-resident resources, resources that reside in memory and resources that reside on the underlying hardware platform.

In a virtual machine environment, the VMM generally has ultimate control over these events and hardware resources to provide proper operation of guest software and for protection from and between guest software running on different virtual machines. To achieve this, the VMM typically receives control (i.e., effects a context switch) when guest software accesses a protected resource or when other events (such as interrupts or exceptions) occur.

Context switches in a VM or other environment cause considerable overhead in modern microprocessors. This overhead is exacerbated by large second level TLBs that must be flushed and reloaded on every context switch. Thus this overhead can adversely impact performance, especially in systems with many active contexts. A need thus exists to more efficiently maintain pipeline resources on context switches.

DETAILED DESCRIPTION

Figure 1:
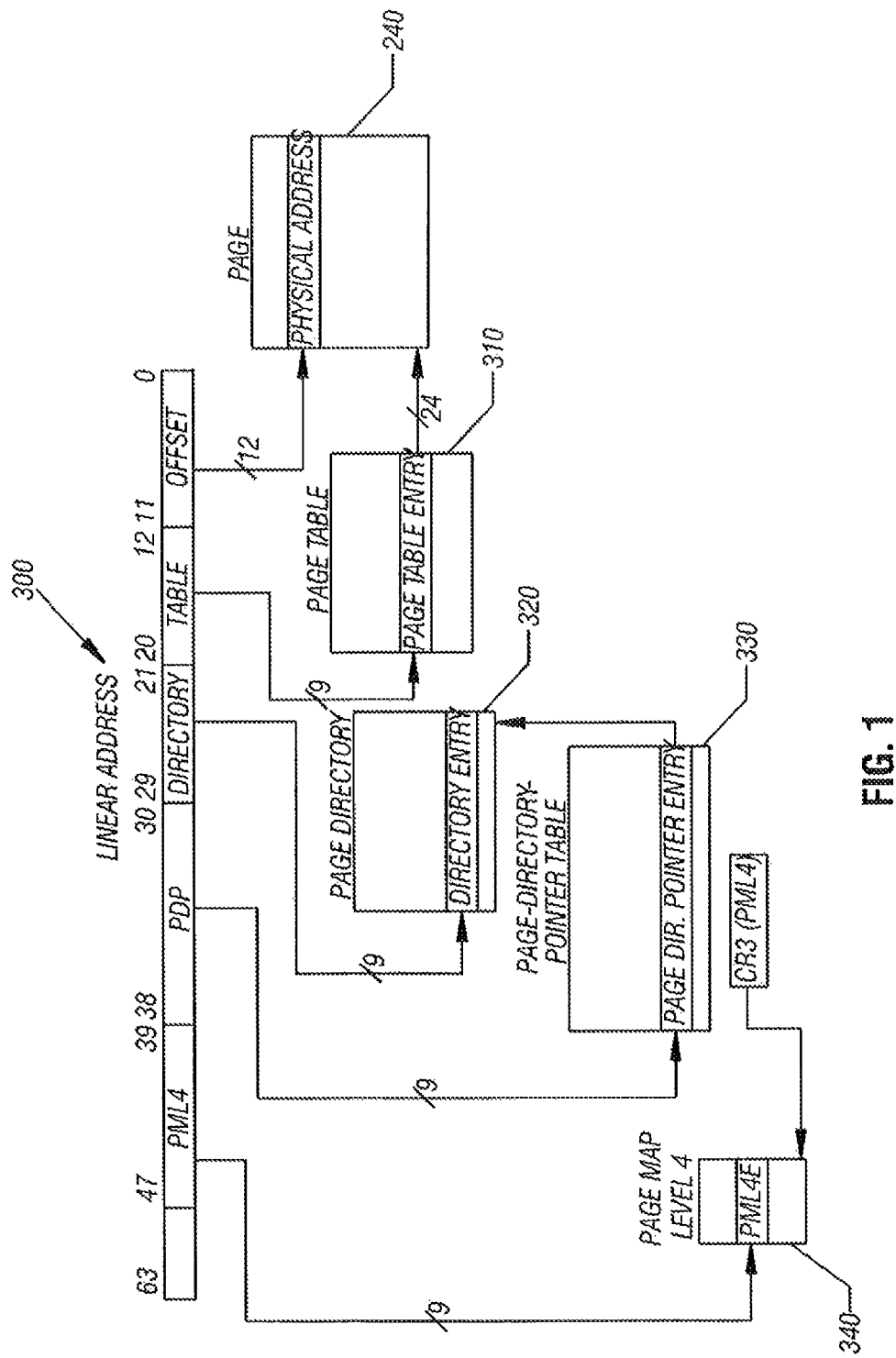
FIG. 1 is a linear address translation in accordance with an embodiment of the present invention.

In various embodiments of the present invention, pipeline resources or structures such as TLBs, trace caches (TC), branch prediction unit (BPU) arrays, mini-tags and the like, may support multiple address spaces. As used herein, the term "address space" means a set of addresses in memory corresponding to a given application (e.g., a context).

In various embodiments, address spaces may be controlled by a combination of architectural control registers (e.g., control register 3 which includes a page directory base register (CR3.PDBR), a page-level cache disable bit (PCD), a page-level write through bit (PWT); control register 0, which includes a paging bit (CR0.PG), a protection enable bit (CR0.PE); control register 4, which includes a page size extension bit (CR4.PSE) and a page global enable bit and a physical address extension bit (CR4.PGE and PAE), an extended feature-enable register-long mode addressing (EFER.LMA) and a no execution bit (EFER.NXE)) that determine or affect linear to physical translations.

In various embodiments, address space identifiers (ASIDs) may be used to augment linear addresses in various pipeline resources with a pointer to the context with which they are associated. As used herein, an "address space identifier" may be any number, code, or other notation which identifies one or more address spaces with which it is associated. In one embodiment, ASIDs may be implemented using a two-bit ASID (i.e., four address space contexts) per thread, although the scope of the present invention is not so limited. This allows multiple application contexts to share pipeline structures, reducing context switch overhead. For example, when a context switch occurs, the current ASID value may be changed, rather than flushing the pipeline structures. Similarly, in certain embodiments, a thread identifier (thread ID) may be provided to identify a given processor thread for a corresponding address space.

Various architectural events may cause a selective flush of the TLBs in accordance with embodiments of the present invention. These events include, for example, a move to CR3 (MOV to CR3) instruction; changing CR0 page mode bits: CR0.PE and CR0.PG and EFER.LMA; changing CR4 page mode bits; VM Entry/Exit; and a 32-bit context switch (if paging mode bits in CR0 or CR4 are changed). In certain embodiments, of these events, only a MOV to CR3 operation or a VMEntry/VMExit event may change/increment the ASID.

Many pipeline structures are linearly tagged or indexed. In various embodiments, ASIDs may augment the linear address in these pipeline resources with a pointer to the corresponding address space. In such embodiments, the microprocessor may maintain a global current ASID register that is updated when a new address space is created or when changing to a different, previously seen address space. TLB insertions may be extended with the current ASID value, and TLB lookups match only if the ASID tag matches the current ASID value. When a context switch (e.g., a MOV to CR3, or VM entry/exit) triggers an address space change, the microprocessor may switch to a different ASID value that represents the new address space, instead of flushing the TLBs and other pipeline structures. In certain embodiments, either not flushing any entries or selectively flushing some or all entries corresponding to a specific address space may provide a substantial performance gain for environments with multiple contexts.

Referring now to FIG. 1, shown is a linear address translation in accordance with an embodiment of the present invention accommodating 64-bit address translations. As shown in FIG. 1, a page in a memory 240 may be addressed using a linear address 300. As shown, linear address 300 includes a number of fields to index a four-level paging structure to access a physical address in memory 240. An offset field (bits 0-11) is used to address the physical address within a page of memory 240. A page table entry (bits 12-20) addresses a page table entry in a page table (PT) 310. A page directory entry (bits 21-29) addresses a page directory entry in a page directory (PD) 320. A page directory pointer (bits 30-38) addresses a page directory pointer entry in a page directory pointer table (PDPT) 330. Finally, a page map level four (PML4) pointer (bits 39-47) addresses a PML4 entry in a PML4 340. The base of PML4 340 may be accessed using a pointer in CR3. In such manner, a 64 bit linear address may be used to implement a four-level paging structure to access a physical address.

In various embodiments, a TLB in accordance with an embodiment may include physical addresses (tag addresses) and associated valid, thread ID and ASID bits, along with corresponding linear and physical addresses. TLB entries include an ASID field in their tag that indicates the address space to which they correspond. That ASID field contains the value of the current ASID when that TLB entry was loaded. Since an ASID field is in the tag of TLB entries, a TLB entry is hit only if the current ASID value matches the ASID field in that TLB entry.

On an address space change (i.e., context switch), microcode may save information about the current address space/ASID (CR3, CR0 and CR4 paging bits, LMA) into a scratchpad and may compare the new address space to the stored address space information of each ASID. If no stored address space/ASID matches the new address space, then the address space has not been seen before. Thus microcode either allocates a new ASID for this address space, or chooses an existing ASID to replace with, for example, a least recently used (LRU) policy. In the latter case, microcode may flush TLB entries for the LRU ASID.

Figure 2:
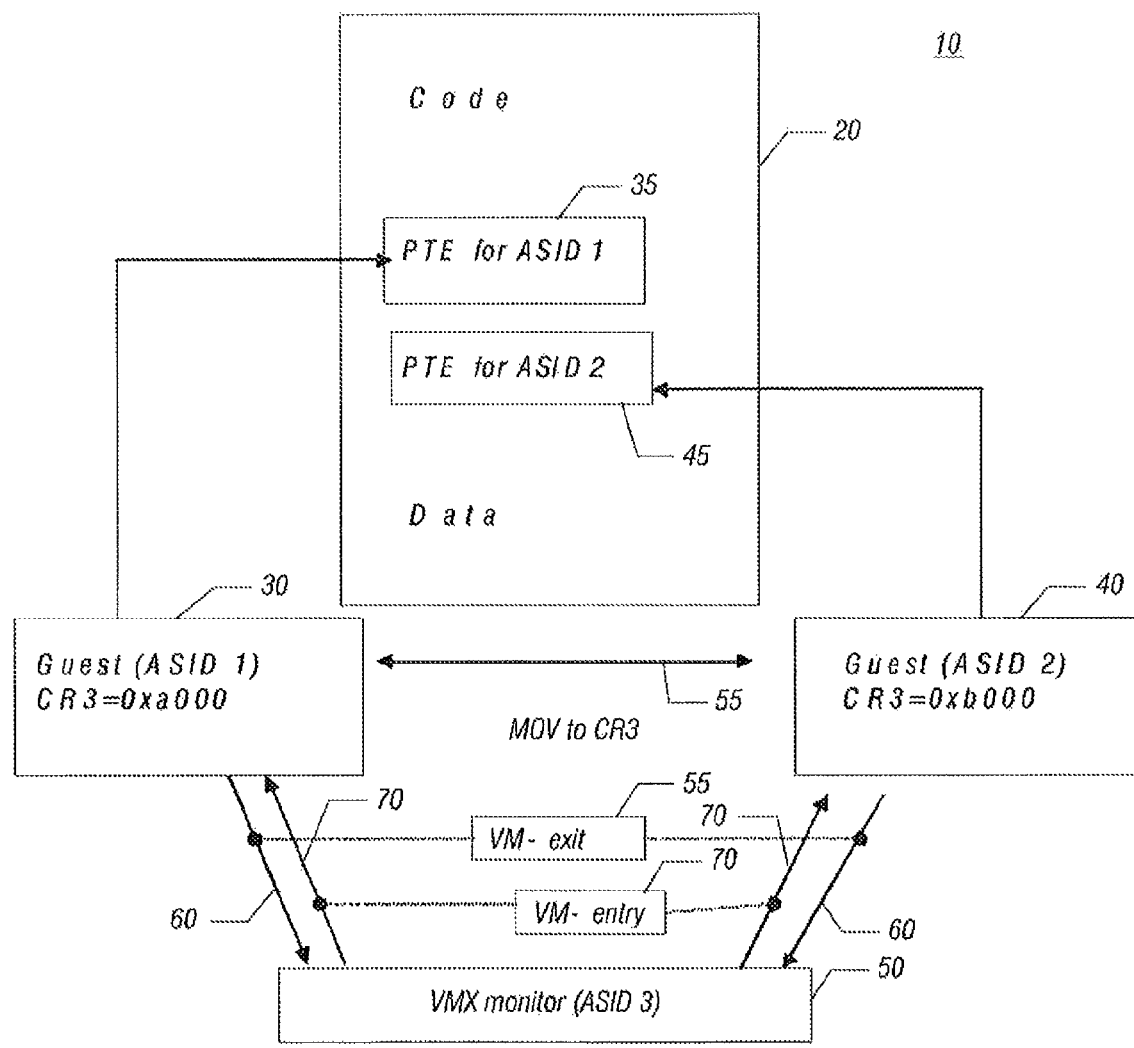
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 10 includes a system memory 20 and various software entities, including a first guest software (i.e., a first guest) 30, a second guest software (i.e., a second guest) 40 and a virtual machine extension (VMX) monitor 50. In one embodiment, system memory 20 may include both code and data and may be formed of dynamic random access memory (DRAM), for example.

In the embodiment of FIG. 2, VMX monitor 50 may present to other software (e.g., the guest software) the abstraction of one or more virtual machines. VMX monitor 50 may provide the same or different abstractions to the various guests. The guest software running on each VM may include a guest OS and various guest software applications. Collectively, guest OS and software applications are referred to herein as guest software. Guest software expects to access physical resources (e.g., processor registers, memory and input/output (I/O) devices) within the VMs on which the guest software is running. VMX monitor 50 may facilitate access to resources desired by guest software while retaining ultimate control over resources within platform hardware.

In one embodiment, criteria (control transfer criteria and/or fault criteria) may be defined using data stored in one or more designated fields in a virtual machine control structure (VMCS) (not shown specifically in FIG. 2). For example, the VMCS may store the state of the guest software and information to control operation thereof. The VMCS may reside in memory 20 and may be maintained by a processor. It is to be understood that any other data structure (e.g., an on-chip cache, a file, a lookup table, etc.) may be used to store the information stored in the VMCS.

In one embodiment, if the transfer criteria determine that a current event must be handled by VMX monitor 50, control is transferred to VMX monitor 50. VMX monitor 50 may then handle the event and transfer control back to guest software. The transfer of control from a VMM or a VMX monitor to guest software is referred to herein as a VM entry, and the transfer of control from the guest software to the VMM or a VMX monitor the VMX monitor is referred to herein as a VM exit.

As shown in FIG. 2, memory 20 may include a first page 35 that may be accessed using a page table entry (PTE) for first guest software 30 and a second page 45 that may be accessed using a PTE for second guest software 40. That is, first page 35 and second page 45 may contain code and/or data corresponding to first guest 30 and second guest 40, respectively. In the embodiment of FIG. 2, memory 20 may correspond to a physical address space that includes both code and data, and the addresses corresponding to the ASIDs of guest software 30 and guest software 40 may correspond to linear addresses (or a portion thereof) used to point to the physical address space.

Still referring to FIG. 2, first guest 30 has a first ASID value (i.e., ASID=1) and furthermore includes a CR3 value corresponding to the first address space. Also, second guest 40 has a second ASID value (i.e., ASID=2) and further has a CR3 value associated therewith.

A VMX monitor that controls execution of first guest software 30 and second guest software 40 may also have an ASID value associated therewith. For example, as shown in the embodiment of FIG. 2, VMX monitor 50 may have an ASID value of three associated therewith.

As shown in FIG. 2, a MOV to CR3 instruction may be executed to cause a context switch, as shown by arrow 55. Furthermore, VMX monitor 50 may control operation of guest software by causing a VM exit, represented by reference numeral 60, which causes an exit from a currently executing guest to force control back to VMX monitor 50. Similarly, VMX monitor 50 may cause initiation or resumption of a guest by performing a VM entry (represented by reference numeral 70 in FIG. 2).

In various embodiments, VMX architectural enhancements may allow a VMX monitor to avoid flushing TLBs or other similar processor resources on context switches and VMX transitions by using ASIDs. In various embodiments, neither explicit ASID management in software nor hardware is needed to detect cross-address space pollution.

In various embodiments, upon events such as those shown in FIG. 2, including a context switch performed using a MOV to CR3 instruction, a VM exit, or a VM entry, flushes of TLBs and other processor resources may be avoided, thus improving performance and reducing overhead on such context switches and other architectural events.

In certain embodiments, pages within system memory 20 or other cached pages are thus protected by VMX monitor 50 across all address spaces so that any attempted storage to such pages may cause a VMX exit from guest software initiating such a store. On such an event, VMX monitor 50 may cause the address(es) corresponding to such stores to be invalidated in all TLBs and other processor resources.

In various embodiments, a processor may handle certain events, instructions and VMX transitions differently. Such different implementations of different instructions and events may be done in processor microcode. For example, on a MOV to CR3 instruction in a guest, a VM exit or a VM entry, a processor may look for an existing ASID that matches the new address space. Such a determination may be made by comparing an ASID of the new address space to a list of ASIDs maintained by the processor. If a match exists, the processor makes that ASID the current ASID without flushing any TLB entries. Otherwise, all TLB entries corresponding to, in one embodiment, the LRU ASID are flushed and the ASID value of the LRU'ed ASID is made the current ASID. The TLB entries from the previous address space may be maintained if that ASID was not flushed.

In contrast, an instruction that invalidates a TLB entry for a specified page (e.g., an INVLPG instruction) may be handled differently. For example, in one embodiment, a linear address space may be invalidated in all TLBs upon such an instruction. Still different operations may occur on other instructions. For example, in one embodiment a MOV to CR4 instruction that detects no change in the CR4 value may invalidate all TLB entries in each ASID.

Figure 3:
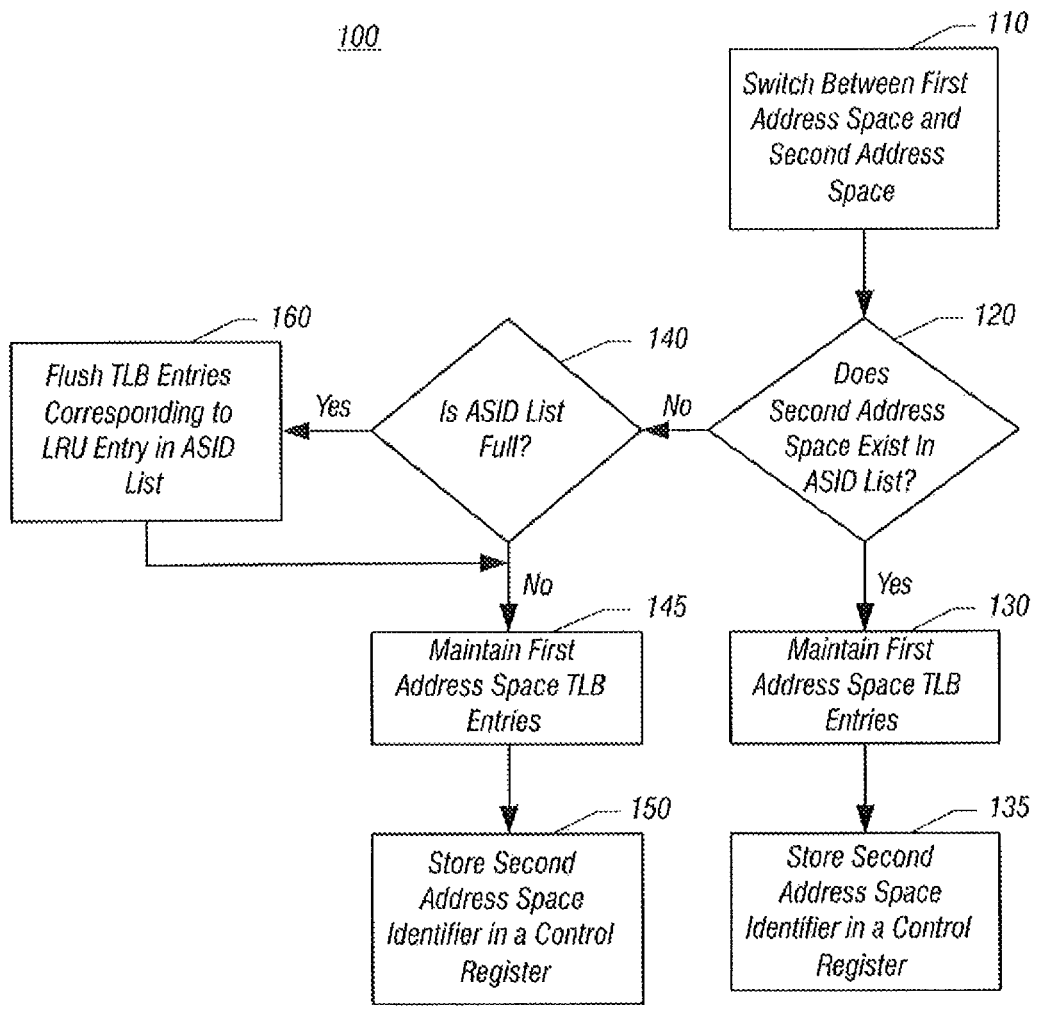
FIG. 3 is a flow diagram of a method in accordance with one embodiment of the present invention.

Referring now to FIG. 3, shown is a flow diagram of a method in accordance with one embodiment of the present invention. Method 100 may be used to switch between different contexts within a processor. As shown in FIG. 3, a switch between first and second address spaces may occur (block 110). While not shown in FIG. 3, prior to such a switch, the first address space may be saved away into a control register (or other memory) corresponding to the current address space identifier. In other embodiments, such saving may occur at other times.

The address space switch may correspond to a VM exit or a VM entry, or may be caused by a MOV to CR3 instruction, or another such event. Next, it may be determined whether the second address space exists in an ASID list (diamond 120). Such a list may be maintained by a processor to identify different active address spaces, locations in linear address spaces corresponding thereto, and optionally other information. For example, the ASID list may be a scratchpad memory in the processor.

If the second address space is present in the ASID list, control may pass to block 130 where the first address space may be maintained, including any entries within TLBs corresponding to the first address space. Furthermore, the second ASID may be stored in a control register of the processor (e.g., a current ASID register) (or other memory location) to indicate that the second address space (i.e., the address space found in diamond 120) is the currently executing address space within the processor (block 135).

If instead at diamond 120 it is determined that the second address space is not present in the ASID list, next it may be determined whether the ASID list is full (diamond 140). If the list is not full, control may pass to block 145 where the first address space may be maintained, including any entries within TLBs corresponding to the first address space. Furthermore, the second ASID may be stored in a control register of the processor (e.g., a current ASID register, or other memory location) to indicate that the second address space (i.e., an empty address space or the freed address space from block 160, discussed below) is the currently executing address space within the processor (block 150).

If at diamond 140 it is instead determined that the ASID list is full, entries within TLBs corresponding to a LRU entry in the ASID list may be flushed (diamond 160). Then control may pass to block 145 for further processing, as discussed above in which the second ASID may be stored in the LRU entry. Accordingly, TLB entries and other resources associated with the second ASID are enabled.

While shown in the embodiment of FIG. 3 as using an LRU policy to flush TLB entries, it is to be understood that in other embodiments, other policies or mechanisms may be used to determine an appropriate address space for flushing when an ASID list is full.

In certain embodiments, depending upon a cause of an address space switch, particular entries within TLBs or other processor resources may be flushed using software. For example, as discussed above, if an attempted store to a protected page causes a VM exit, addresses within TLBs corresponding to the protected space are flushed. That is, in various implementations of a VMX architecture, a VMX monitor protects each paging hierarchy. In a virtualization environment, software may be used to flush a TLB or other resources as dictated by a guest. Then, certain events undertaken by the guest (e.g., a MOV to CR3 instruction) will not flush resources because the virtualization software handles flushing activities as described herein. Thus in the guest, if any store instruction modifies a TLB entry used by a CR3 in a CR3 target value, a VM exit occurs.

With translucent ASIDs in accordance with an embodiment of the present invention, after such a VM exit, the software may flush all TLB entries corresponding to the store instruction that caused the VM exit, even if the TLB entry was not in use by the guest at the time of the VM exit. In such an embodiment, if the software desires to flush an individual entry, the software may perform an INVLPG instruction with a linear address that corresponds to that TLB entry in the appropriate address space. On such a software-invoked INVLPG, the processor may flush any TLB entries corresponding to that linear address, regardless of their ASID. While described as being implemented using an INVLPG instruction, in other embodiments other instructions or operations may flush such entries.

Figure 4:
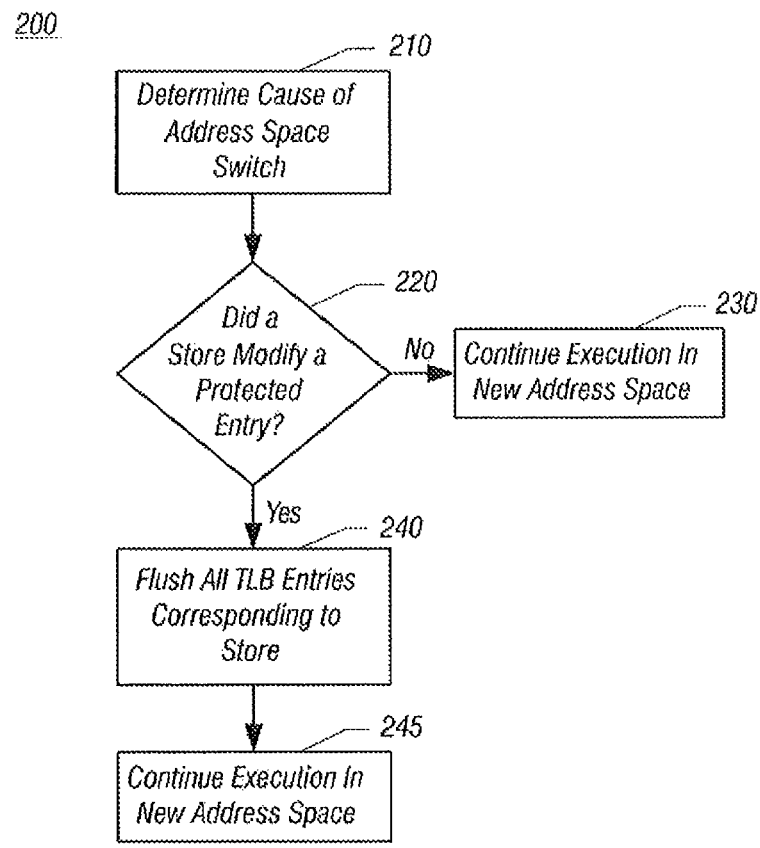
FIG. 4 is a flow diagram of a method in accordance with another embodiment of the present invention.

Referring now to FIG. 4, shown is a flow diagram of a method in accordance with one embodiment of the present invention. More particularly, FIG. 4 shows a method 200 for flushing certain entries within a TLB. Such a method may be performed in a VM environment, and may be initiated upon a VM exit. As shown in FIG. 4, method 200 may begin by determining a cause of a VM exit (block 210). For example, in one embodiment a last operation prior to a VM exit may be analyzed to determine whether a store or other memory operation to a protected memory space caused the VM exit. Of course, there may be many other reasons for a VM exit to occur.

Then, at diamond 220 it may be determined whether a store operation attempted to modify a protected entry, such as a protected TLB entry (e.g., corresponding to a different address space). If not, normal execution of the VMX monitor may continue (block 230). Such execution may take many forms, depending on program instructions. After such execution, control may return to the guest, if desired.

If instead it is determined that a store attempted to modify a protected entry, the VMX monitor may perform the store operation (block 235), as it has access to the protected location that the guest does not. Then, all TLB entries corresponding to the store address may be flushed from all TLBs and other processor resources (block 240). A VM entry may then return control to the guest for continued execution (block 245). Such execution may continue at a next instruction of the guest, for example.

In still other embodiments, it may be desirable to flush all entries within all TLBs. For example, if higher level paging mechanisms have been modified, such flushing may be desired to clear the TLBs or to remove an address space from the TLBs when a VMX monitor will no longer protect it. In one embodiment, if the software desires to flush an entire TLB for an address space, the software may perform a MOV to CR4 instruction with the exact same value already stored there. When the processor sees such a CR4 write, it may flush all TLBs for all ASIDs, since the software does not specify which ASID needs to be flushed. In various embodiments, the software may flush an entire TLB for an address space if a PDE (or higher) entry was changed or if a CR3 is being removed from the CR3 target value and the monitor will no longer protect it.

Figure 5:
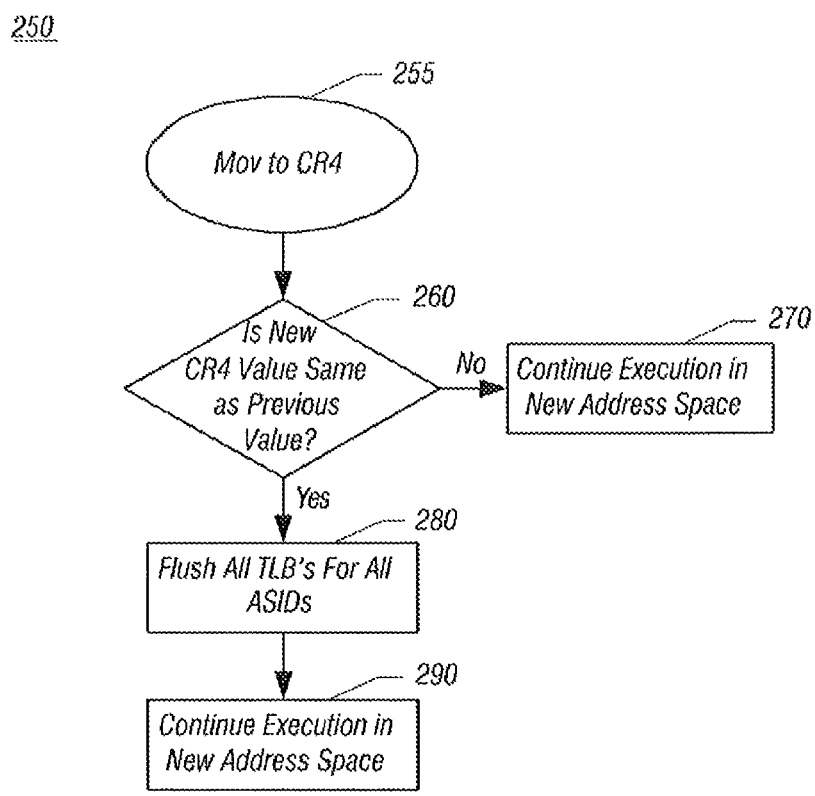
FIG. 5 is a flow diagram of a method in accordance with yet another embodiment of the present invention.

Referring now to FIG. 5, shown is a flow diagram of another method in accordance with an embodiment of the present invention. Specifically, method 250 may be used to flush all TLBs for all ASIDs. As shown in FIG. 5, such a method may begin by receiving a MOV to CR4 instruction (oval 255). Upon receipt of such an instruction, a processor may determine whether the new CR4 value is the same as its previous value (diamond 260). If the new address value is not the same, normal CR4 operation(s) may be performed (block 270). Such operations may vary based on the state of the different bits in the CR4. For example, based on the bit states, processor resources such as TLBs may be flushed, and other processing may occur. For example, CR4 transitions that change data may cause the need to flush entries in at least a current TLB. Furthermore, such a CR4 transition may require a change in address spaces. Such an address space change may be performed in similar manner as described above with regard to FIG. 3.

If instead it is determined that the new value is the same as the previous value, this may be a flag to indicate that a VMX monitor or other entity desires to flush all TLBs. As described above there may be various reasons to flush all TLBs. Accordingly, at block 280, all TLBs may be flushed for all ASIDs. Finally, execution may continue in the same (i.e., original) address space (block 290) (e.g., at a next instruction).

While described in the embodiment of FIG. 5 as being implemented upon a MOV to CR4 instruction, it is to be understood that in other embodiments other instructions or operations may be used as a flag to indicate that a VMX monitor or other entity desires to flush all TLBs. Further, while described in reference to FIG. 5 with this particular implementation, in other embodiments any selected value resulting from a predetermined instruction may be analyzed to determine if the value was changed. If not, a desired action may be taken in one or more processor resources.

Figure 6:
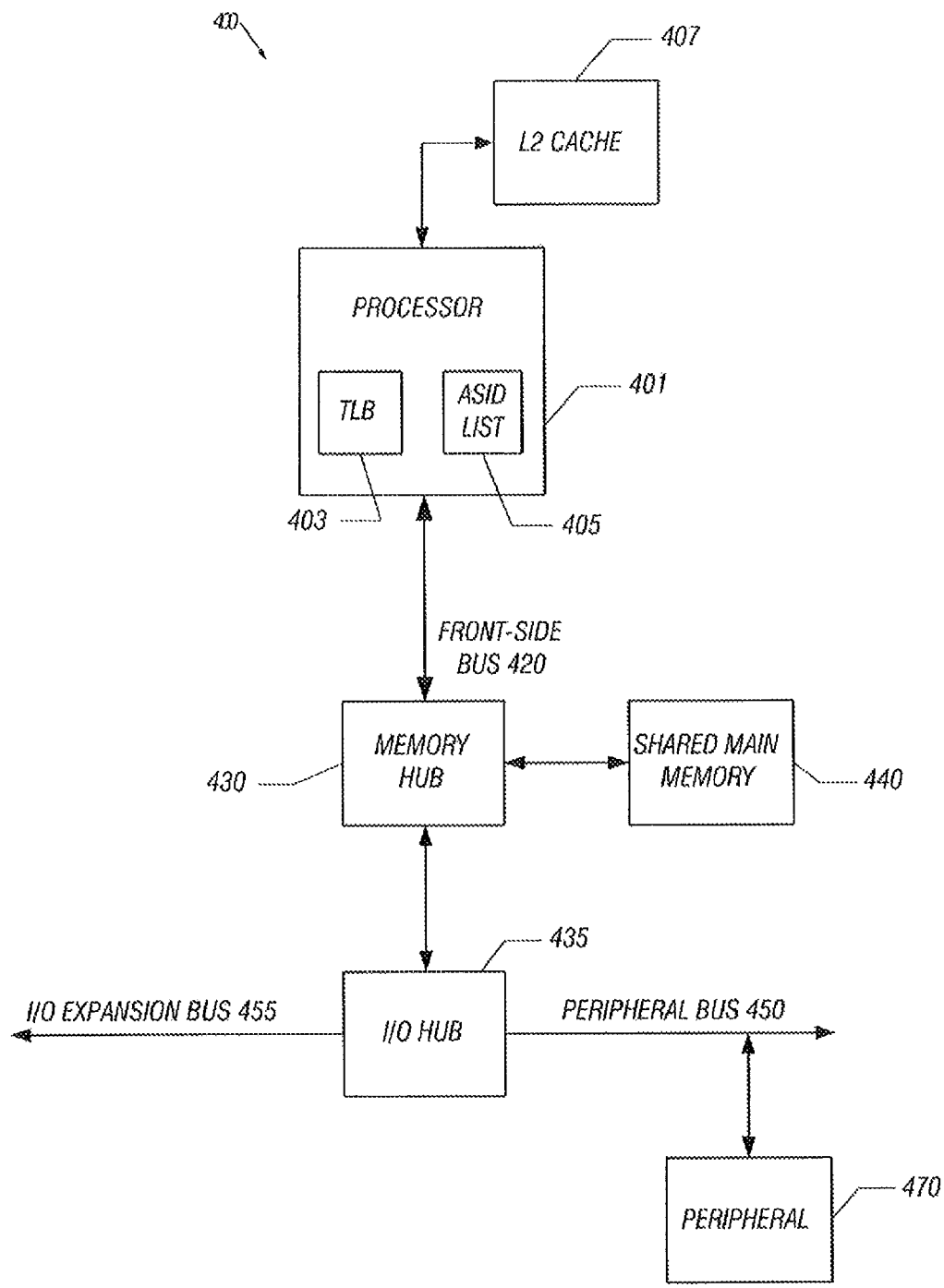
FIG. 6 is a block diagram of a representative computer system in accordance with one embodiment of the invention.

Referring now to FIG. 6, shown is a block diagram of a representative computer system 400 in accordance with one embodiment of the invention. As shown in FIG. 6, computer system 400 includes a processor 401. Processor 401 may be coupled over a front-side bus 420 to a memory hub 430 in one embodiment, which may be coupled to a shared main memory 440 via a memory bus. As shown in FIG. 6, processor 401 may include a TLB 403 and an ASID list 405 in accordance with an embodiment of the present invention. More so, a level 2 (L2) cache 407 may be coupled to processor 401.

Memory hub 430 may also be coupled (via a hub link) to an I/O hub 435 that is coupled to an I/O expansion bus 455 and a peripheral bus 450. In various embodiments, I/O expansion bus 455 may be coupled to various I/O devices such as a keyboard and mouse, among other devices. Peripheral bus 450 may be coupled to various components such as peripheral device 470 which may be a memory device such as a flash memory, add-in card, and the like. Although the description makes reference to specific components of system 400, numerous modifications of the illustrated embodiments may be possible.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Because software is helping the processor protect and invalidate TLB entries, in various embodiments TLB entries may be maintained on context switches (e.g., MOV to CR3, VM exit, and VM entry). Thus in various embodiments, no snoopy TLB hardware is needed, avoiding snoopy TLB capacity or other limitations.

In other embodiments, translucent ASIDs may be used with any architecture containing page tables which does not explicitly assign IDs to different address spaces, but requires that the processor take a special action to flush TLB entries after modifying page tables, even if that TLB entry is not currently in use by the current address space.

Accordingly, in various embodiments, a processor may support ASIDs and avoid TLB flushes (e.g., on context switches) without either specialized hardware to detect cross-address space pollution or explicit software control and ASID allocation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a dynamic random access memory;
   a level 2 (L2) cache;
   a flash memory; and
   a processor coupled to the dynamic random access memory, the L2 cache, and the flash memory, the processor comprising:
      execution logic to support a virtual machine monitor;
      address space control registers to store a plurality of control bits, including a physical address extension bit and a no execution bit;
      a translation lookaside buffer (TLB) to store a plurality of page table entries (PTEs) to translate virtual addresses to physical addresses of memory pages and address space identifiers (ASIDs), an ASID to identify an address space associated with corresponding PTEs, the ASID to match a value of a current ASID when the corresponding PTEs are loaded into the TLB; and
      a current ASID register to store the current ASID, the current ASID register to be updated on a context switch to a different address space;
   wherein, in response to the context switch and based on ASIDs of the PTEs and the current ASID stored in the current ASID register, the processor is to either not invalidate any PTEs of the TLB or to selectively invalidate one or more PTEs of the TLB;
   wherein, based on a first instruction to invalidate TLB entries corresponding to a specified address, the processor is to flush any TLB entries corresponding to that address, regardless of their ASID; and
   wherein, based on a second instruction, the processor is to transfer control from quest software to the virtual machine monitor.

2. The system of claim 1, wherein based on a third instruction, the processor is to return control from the virtual machine monitor to guest software.

3. The system of claim 1, wherein the processor is to determine whether a current event must be handled by the virtual machine monitor and is to transfer control to from guest software to the virtual machine monitor if the current event must be handled by the virtual machine monitor.

4. The system of claim 1, wherein the address space control registers include a page directory base register.

5. The system of claim 1, wherein the processor further comprises a branch prediction unit.

6. The system of claim 1, further comprising a system memory storing software, including the guest software and the virtual machine monitor.

7. The system of claim 1, further comprising a system expansion bus to couple an input/output device to the system.

* * * * *